US012541141B2

(12) United States Patent
Leschinsky et al.

(10) Patent No.: US 12,541,141 B2
(45) Date of Patent: Feb. 3, 2026

(54) CARRIAGE SYSTEM

(71) Applicant: Canon Virginia, Inc., Newport News, VA (US)

(72) Inventors: Connor Leschinsky, Hampton, VA (US); Thomas Wheeless, Hampton, VA (US); Leonardlee Pascual, Chesapeake, VA (US); Hesham Elsaghir, Coral Springs, FL (US); Paul Risque, Williamsburg, VA (US); Taisuke Isano, Tochigi (JP)

(73) Assignee: Canon Virginia, Inc., Newport News, VA (US)

( * ) Notice: Subject to any disclaimer, the term of this patent is extended or adjusted under 35 U.S.C. 154(b) by 944 days.

(21) Appl. No.: 17/438,870

(22) PCT Filed: Mar. 11, 2020

(86) PCT No.: PCT/US2020/022154
§ 371 (c)(1),
(2) Date: Sep. 13, 2021

(87) PCT Pub. No.: WO2020/185935
PCT Pub. Date: Sep. 17, 2020

(65) Prior Publication Data
US 2022/0155659 A1    May 19, 2022

Related U.S. Application Data

(60) Provisional application No. 62/818,346, filed on Mar. 14, 2019.

(51) Int. Cl.
G03B 17/56    (2021.01)
F16M 11/18    (2006.01)
F16M 11/42    (2006.01)

(52) U.S. Cl.
CPC ........... *G03B 17/561* (2013.01); *F16M 11/18* (2013.01); *F16M 11/425* (2013.01)

(58) Field of Classification Search
CPC ......... F16M 11/425; F16M 11/18; B61F 5/06; B61F 5/40
See application file for complete search history.

(56) References Cited

U.S. PATENT DOCUMENTS 3,688,676 A    9/1972 Rosemount S
4,255,897 A    3/1981 Ruthner
(Continued)

FOREIGN PATENT DOCUMENTS

AU    2005310343 A1    6/2006
CN    102550014 A    7/2012
(Continued)

*Primary Examiner* — Leon W Rhodes, Jr.
(74) *Attorney, Agent, or Firm* — Canon U.S.A., Inc., IP Division

(57) ABSTRACT

A carriage that records data while moving on a rail system including a first moving unit located on one side of the rail and configured to move along the rail, a second moving unit located on a different side of the rail from the first moving unit and configured to move along the rail, a spring unit configured to slide one or more of the moving units in a direction perpendicular to the direction of the rail, and a position maintaining unit located between the first moving unit and the second moving unit, wherein the position maintaining unit prevents the first moving unit or the second moving unit from sliding more than a predetermined distance when traveling along the rail.

12 Claims, 15 Drawing Sheets

(56) References Cited

U.S. PATENT DOCUMENTS

| | | |
|---|---|---|
| 4,441,145 A | 4/1984 | Antkowiak |
| 4,699,484 A | 10/1987 | Howell |
| 5,130,545 A | 7/1992 | Lussier |
| 5,225,863 A | 7/1993 | Weir-Jones |
| 5,526,041 A | 6/1996 | Glatt |
| 6,834,960 B2 | 12/2004 | Dbjay |
| 7,733,383 B2 * | 6/2010 | Kato .................. H04N 23/88 |
| | | 348/371 |
| 7,937,891 B2 | 5/2011 | Benfey |
| 8,358,097 B2 | 1/2013 | Cartwright |
| 9,021,739 B2 | 5/2015 | Koo |
| 9,904,150 B1 | 2/2018 | Zhu et al. |
| 10,368,497 B2 | 8/2019 | McReynolds |
| 10,597,896 B1 | 3/2020 | Hamilton |
| 10,755,443 B1 | 8/2020 | Trundle |
| 10,952,381 B2 | 3/2021 | Millar |
| 10,986,789 B1 | 4/2021 | Roberts |
| 2005/0085941 A1 | 4/2005 | Overskeid |
| 2006/0087847 A1 | 4/2006 | Yamanaka |
| 2008/0002049 A1 | 1/2008 | Saito |
| 2008/0052052 A1 | 2/2008 | Stearns |
| 2009/0214324 A1 | 8/2009 | Grinnell |
| 2013/0155672 A1 | 6/2013 | Vo |
| 2013/0302024 A1 | 11/2013 | Eckert et al. |
| 2014/0376773 A1 | 12/2014 | Holz |
| 2015/0012168 A1 | 1/2015 | Kuklish et al. |
| 2015/0116958 A1 | 4/2015 | Shedletsky et al. |
| 2015/0204787 A1 | 7/2015 | Kramer |
| 2015/0309394 A1 | 10/2015 | Janze et al. |
| 2016/0290912 A1 | 10/2016 | Kent |
| 2017/0027110 A1 | 2/2017 | Ito |
| 2017/0208296 A1 | 7/2017 | Diep |
| 2017/0299112 A1 | 10/2017 | Sauret et al. |
| 2018/0023755 A1 | 1/2018 | Matthews et al. |
| 2018/0035616 A1 | 2/2018 | Wagner |
| 2018/0228104 A1 | 8/2018 | Mirzeabasov |
| 2018/0359901 A1 | 12/2018 | Millar |
| 2019/0028932 A1 | 1/2019 | Gunyel |
| 2020/0229357 A1 | 7/2020 | Spiro |

FOREIGN PATENT DOCUMENTS

| | | | |
|---|---|---|---|
| CN | 106163262 A | | 11/2016 |
| EP | 2876880 A1 | | 5/2015 |
| JP | H08-37883 A | | 2/1996 |
| JP | 2004140589 A | | 5/2004 |
| JP | 2005-516868 A | | 6/2005 |
| JP | 2005225243 A | * | 8/2005 |
| JP | 2007006716 A | | 1/2007 |
| JP | 2015065965 A | | 4/2015 |
| JP | 2015-195786 A | | 11/2015 |
| JP | 2016051312 A | | 4/2016 |
| JP | 2016198055 A | | 12/2016 |
| JP | 2016202124 A | | 12/2016 |
| JP | 2017085989 A | | 5/2017 |
| JP | 2017103763 A | | 6/2017 |

* cited by examiner

CARRIAGE SYSTEM

CROSS-REFERENCE TO RELATED APPLICATIONS

This application is the U.S. National Phase of PCT/US20/22154 filed Mar. 11, 2020, which claims priority to U.S. Application No. 62/818,346, which was filed on Mar. 14, 2019, and is incorporated herein in its entirety.

BACKGROUND

Technical Field

The present disclosure relates to a carriage system for traveling along a rail.

Background

In a vertical farming environment, a monitoring carriage system that monitors the status of objects, e.g., plants, crops, etc., in the vertical farm is typically installed at the top of a grow light rack to monitor the objects in each layer. The carriage typically moves on straight and curved rails to obtain images of the objects so that a user can monitor conditions of all the objects. Often the operational envelope for such a system is restricted by low height clearance for better growth efficiency of the plants. To achieve optimal performance in this environment, the height requirements created by the support of electrical and mechanical components needs to be minimized while maintaining alignment.

A motorized slider system that is used with various camera devices mounted on top of a housing using a mounting screw has been described in U.S. Patent Publication No. 2018/0023755. The system includes a motorized shuttle that travels on both straight and curved connected tracks for video and time-lapse photography. A side roller is fixed onto the body of the slider system. A suspension arm is attached to a main body of the shuttle around a shaft so that it can slide along a straight track and a curved track. Springs around the shaft provide force that pulls the suspension arm toward the main body of the shuttle.

While U.S. Patent Publication No. 2018/0023755 is seen to disclose that the motorized shuttle can travel on straight and curved connected tracks. Due to the fixed structural design of the main body and limited flexibility of the suspension arm, traveling along on the curve, stretches the suspension arm outward away from the main body of the shuttle, making the shuttle skew or off-set away from the center of the rail. This skewing causes a decrease in position and angle accuracy. Thus, U.S. Patent Publication No. 2018/0023755 it is not seen to disclose that the motorized shuttle can be centered in the path while traveling along on the curve.

Printed circuit boards (PCBs) are used in numerous devices, assemblies, etc. for various functions. The PCB must be mounted within its associated device, assembly, etc. There are various ways in which to mount PCBs. For example, U.S. Patent Publication No. 2015/0116958 is seen to discuss a method that utilizes a coating applied to the top of a PCB as a way to structurally mount the PCB.

In some instances, the way in which a PCB is mounted can adversely affect the size of the associated device, assembly, etc. For example, duplication of supporting substrates can increase the overall volume of an assembly and prevent the use of the assembly in environments where an operational envelope is restricted. A method disclosed in U.S. Patent Publication No. 2015/0116958 includes connecting multiple electrical components or boards while reducing or eliminating board to board connectors by utilizing additive materials to increase the strength of the assembly. Such an approach can lead to an increase in the size of the assembly making it difficult to use this method in an environment where there are significant height restrictions with respect to mounting components.

SUMMARY

A carriage for traveling on a rail according to an aspect of the present disclosure includes a first moving unit located on one side of the rail and configured to move along the rail, a second moving unit located on a different side of the rail from the first moving unit and configured to move along the rail, a spring unit configured to slide one or more of the first moving unit and the second moving unit in a direction perpendicular to the direction of the rail, and a position maintaining unit located between the first moving unit and the second moving unit, wherein the position maintaining unit prevents the first moving unit or the second moving unit from sliding more than a predetermined distance when traveling along the rail.

This and other embodiments, features, and advantages of the present disclosure will become apparent upon reading the following detailed description of exemplary embodiments of the present disclosure, when taken in conjunction with the appended drawings, and provided claims.

DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. While aspects of the explanatory embodiments are described within a vertical farming environment, this is provided merely as an example and does not limit the uses and environments of the disclosure.

In a vertical farming environment, the vertical height between the racks is often very limited in order to use the space as efficiently as possible. This results in the operational envelope being restricted by low height clearance and it is advantageous to utilize an automated system to monitor the growth and health of the plants. To achieve optimal performance in this environment, the height requirements created by the support of electrical and mechanical components need to be minimized while still maintaining alignment of the monitoring carriage. In addition, it is advantageous to implement a system where the carriage travelling on the rail can be centered in a path while traveling along a curved portion of the rail.

Figure 1:
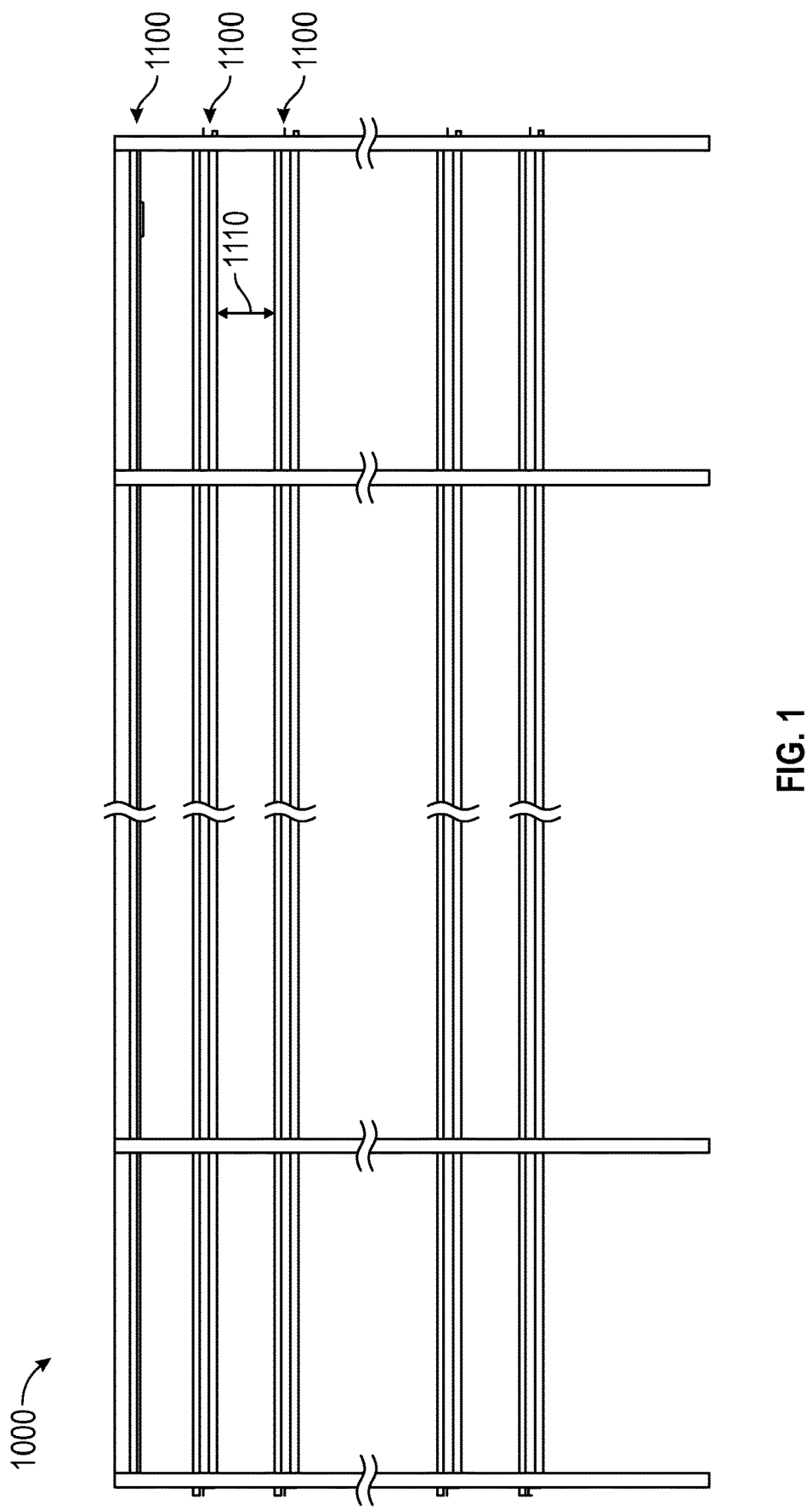
FIG. 1 illustrates an example of a typical rack structure used in a vertical farm.

FIG. 1 illustrates an example of a layered rack system 1000 for growing plants, crops, etc., in a vertical farming environment. The racks 1100 are stacked as illustrated in FIG. 1 so that the effective growing area is increased compared to a similar two dimensional flat area. The height 1110 of each layer of the rack can be minimized as an operator may require only a small amount of room for operation and maintenance.

Figure 11:
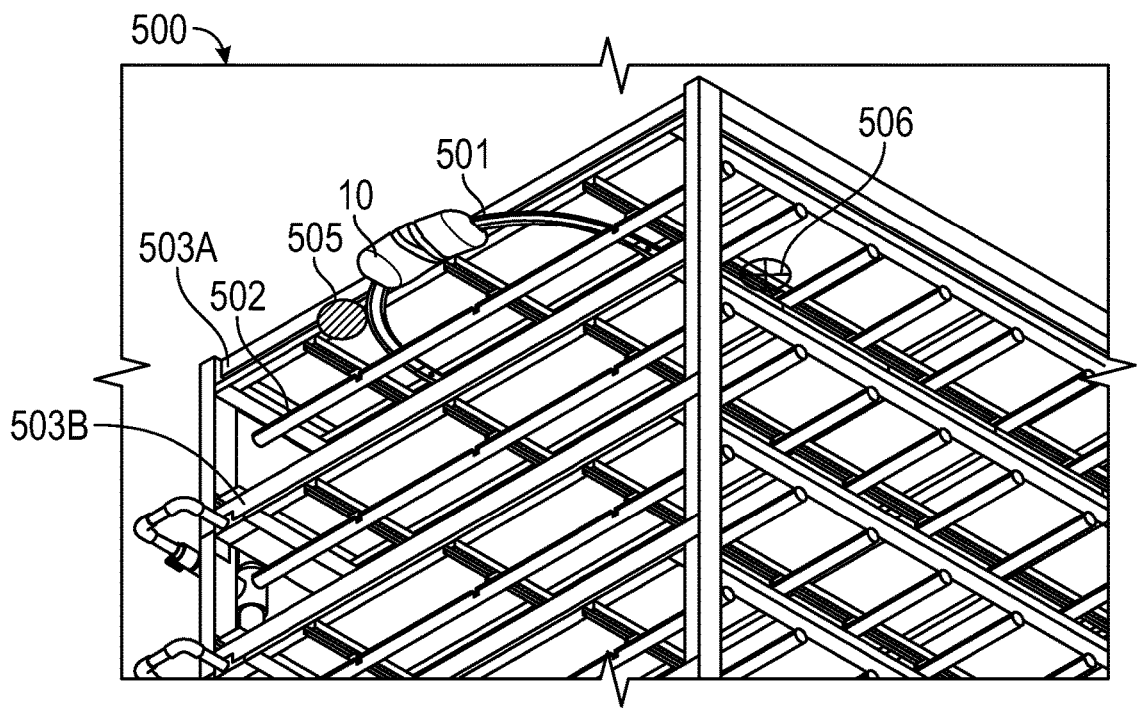
FIG. 11 illustrates a diagram of an external view of an example embodiment of the monitoring system.

FIG. 11 is a perspective bottom view of a partial rack structure where the plants are located on the lower rack 503B with grow lights 502, supported by the upper rack 503A, located above them. An exemplary monitoring system 500 is illustrated between the upper rack 503A and the lower rack 503B. The monitoring system 500 includes rails 501 and a monitoring carriage 10 which travels on the rails above the growing surface of the lower rack 503B. The monitoring system 500 can be configured as a multi-layer or a single-layer structure. In a multi-layer structure, a monitoring carriage 10 can be installed on each layer, or a single monitoring carriage 10 can move from layer to layer.

The rail 501 can be installed above the grow lights 502 or below them. In this exemplary embodiment, the rail forms an oval track installed above the grow lights 502 and the profile of the rail is shaped as an inverted U-shape with a shelf on either side, as illustrated in the close ups in FIG. 10.

The monitoring carriage 10 travels along the rails 501 by mechanically griping the shelves on either side of the rail. As it monitors the plants, it stops at various locations, identified with an NFC tag 506, around the oval so that information can be obtained in each location. Additionally, the monitoring carriage 10 can stop below a wireless charging port 505 and recharge without needing to be removed from the rail 501.

It is advantageous for the monitoring carriage 10 to be thin, so that it can travel within the restricted vertical space. The monitoring carriage 10, according to the exemplary embodiment, is approximately 3 cm in height. This height is not seen to be limiting, and any height that will enable practice of the exemplary embodiment is applicable.

Figure 2A:
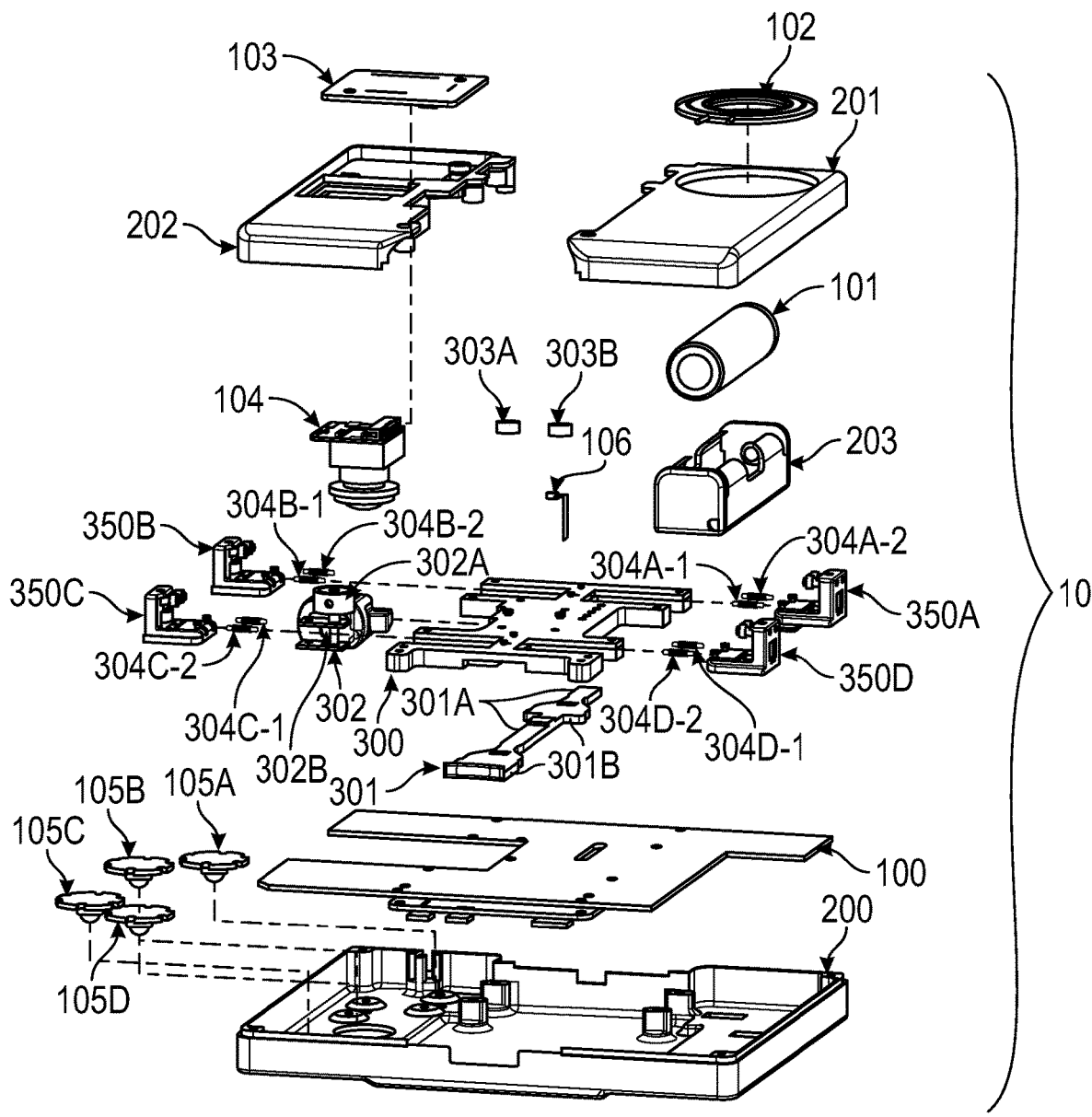
FIG. 2A illustrates an exploded view of a monitoring carriage.
Figure 2B:
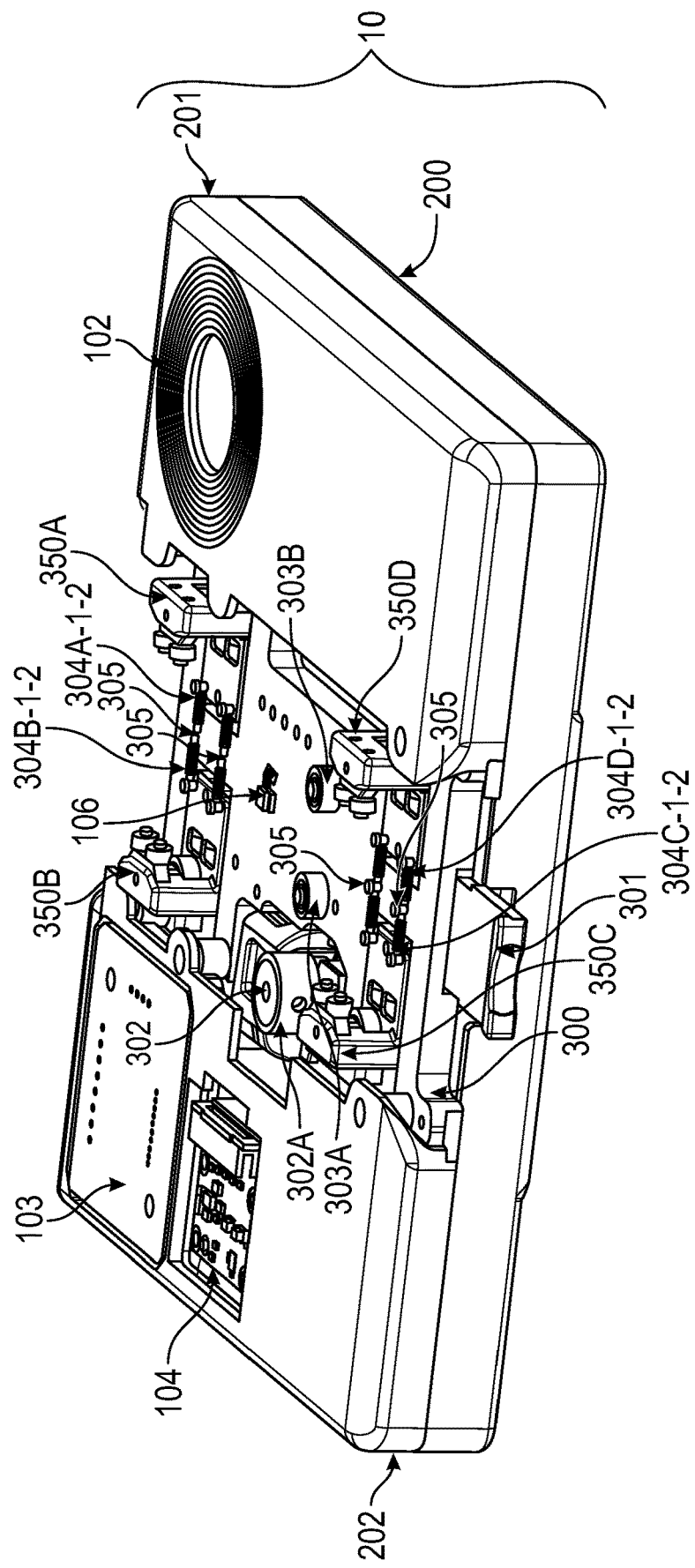
FIG. 2B illustrates a collapsed view of the monitoring carriage.

FIGS. 2A-2B illustrate a monitoring carriage 10 according to an exemplary embodiment of the present disclosure. FIG. 2A is an exploded view of the components and FIG. 2B is a collapsed view of the underside of the monitoring carriage 10. In the following description of the exemplary embodiments, components with "100" level reference numbers relate to the electrical functionality of the monitoring carriage 10, components with "200" level reference numbers relate to components used to physically support and enclose the components of the monitoring carriage 10, and components with "300" level reference numbers relate to components used to enable motion of the monitoring carriage 10.

A printed circuit board (PCB) 100 houses the electronic components that control the carriage system's functions. It also enables wireless communication with remote systems and is connected via screws to frame 300, which is described below.

A battery 101 provides power to the entire carriage system. In the exemplary embodiment, the battery 101 can be recharged multiple times throughout the life of the carriage. The battery 101 is located within battery enclosure 203. A wireless charging coil 102 is connected to the PCB 100 and provides power to the battery 101 when aligned with a corresponding charging coil that is mounted within a separate charging station and powered by an external source. The wireless charging coil 102 is located within enclosure 201. With the use of the wireless charging coil 102, a user is able to avoid performing a power charging operation for the monitoring carriage 10 and removes the need for a structure to plug in or out a power source to charge the monitoring carriage 10.

An NFC reading assembly 103 is a near-field communication reading assembly with circuitry and antenna attached to a separate printed circuit board that is a sub-component of the NFC reading assembly 103. The NFC reading assembly 103 is electrically connected to the PCB 100 and relays information obtained from NFC tags 506 to the PCB 100 to be used in localization and tagging procedures. The NFC tags 506 are located on the rack at predetermined positions and/or at predetermined distances between each other. The NFC reading assembly 103 is located within enclosure 202.

A camera 104 (recording unit) is a camera and lens assembly and can obtain still images and/or video images. The camera 104 is electrically connected to the PCB 100 and relays image data to PCB 100 for processing and storage. The camera 104 is located within enclosure 200 and enclosure 202.

LED's (light emitting diodes) 105A-D are LED assemblies comprised of a diode and a heat sink. LED's 105A and 105B are white LED's that illuminate plants and culture medium, where the illuminated area is larger than the area captured by the camera 104. LED's 105C and 105D are ultra violet (UV) LED's that illuminate plants and culture medium, where the illuminated area is larger than the area captured by the camera 104. LED's 105A-D are housed in the monitoring carriage 10 and are used when the camera 104 captures images. The plurality of LED assemblies ensures more broad and even distribution of light. In the exemplary embodiment, LED's 105A-D are located within enclosure 200.

Sensor 106 is a Hall effect sensing device and is electrically connected to the PCB 100. In the exemplary embodiment, the sensor 106 enables the detection of a magnetic field that enables the detection of a magnet with sufficient magnetic field mounted within the charging station 505. The sensor 106 is located on the frame 300.

The enclosure segment 200 is mounted to the side of the monitoring carriage 10 closest to the growing area. As previously described, the enclosure segment 200 houses components such as the PCB 100, the camera 104, and LED's 105A-D.

In addition to the enclosure segment 200, the exemplary embodiment also provides an enclosure segment 201, an enclosure segment 202, and a battery enclosure segment 203. These enclosure segments provide protection from particulate contamination, physical impact, water damage, or other factors that can affect operation of the monitoring carriage 10. The enclosure segment 201 is mounted to the rail side of the monitoring carriage 10 and includes several subsystem components, including the wireless charging coil 102. The enclosure segment 202 is mounted to the rail side of the monitoring carriage 10 and houses several subsystem components, including the NFC reading assembly 103. The battery enclosure segment 203 is an internal enclosure that holds the battery 101 and includes electrical terminals that contact the corresponding terminals of the battery 101. The battery enclosure segment 203 is located within the enclosure segment 200.

The frame 300 is a substrate designed to provide physical support to the various components described below. The PCB 100 and the enclosure segments 200, 201, 202 are all attached to frame 300.

Each wheel assembly (moving unit) 350A-D is a subassembly having several bearings that contact the rail 501. Each wheel assembly slides within a slot of the frame 300 and a portion of the wheel assembly is between the frame 300 and the PCB 100. The wheel assemblies that travel on the same side of the rail form a wheel set. The explanatory embodiment of the monitoring carriage 10 includes two sets of wheel assemblies with the first set including wheel assemblies 350A and 350D referred to below as wheel set 350A,D, and the second set including wheel assemblies 350B and 350C and referred to below as wheel set 350B,C.

Each wheel assembly is attached to the frame with two springs (slide units) 304A-D. The springs 304A-D enable each of the wheel assemblies 350A-D to move freely in a perpendicular direction to the frame 300 while holding onto the rail 501. For example, the springs 304A-1 and 304A-2 attach the wheel assembly 350A to posts 305 in the center of the frame and move in a direction perpendicular to the direction of the rail 501 or the direction in which the monitoring carriage 10 travels. In the exemplary embodiment, springs are used, but any dynamic moving mechanical component that can pull the wheel assemblies 350A-D and the frame 300 together can be used.

A wedge 301 is a mechanical wedge that is used to move the wheel assemblies 350A-D away from the frame to allow the monitoring carriage 10 to be easily removed from the rail 501. The wedge 301 includes two narrow portions 301A and two wide portions 301B. The wedge 301 is located between the frame 300 and the PCB 100.

A driving wheel assembly (movement device) 302 includes a motor 302B and a driving wheel 302A. The motor 302B is connected to the frame 300 in a way that enables the driving wheel assembly 302 to travel perpendicularly to the PCB 100. The motor 302B is connected electrically to the PCB 100 and receives power from the battery 101.

Centering units (position maintaining units) 303A-B are components used for centering the monitoring carriage 10. The centering units 303A-B contact the inside of the rail, while the monitoring carriage 10 is in the mounted position, to aid with alignment. In the exemplary embodiment, one or more instances of the centering units 303A-B are distributed on the assembly to promote proper alignment. The centering units 303A-B are connected to the frame 300.

Figure 3A:
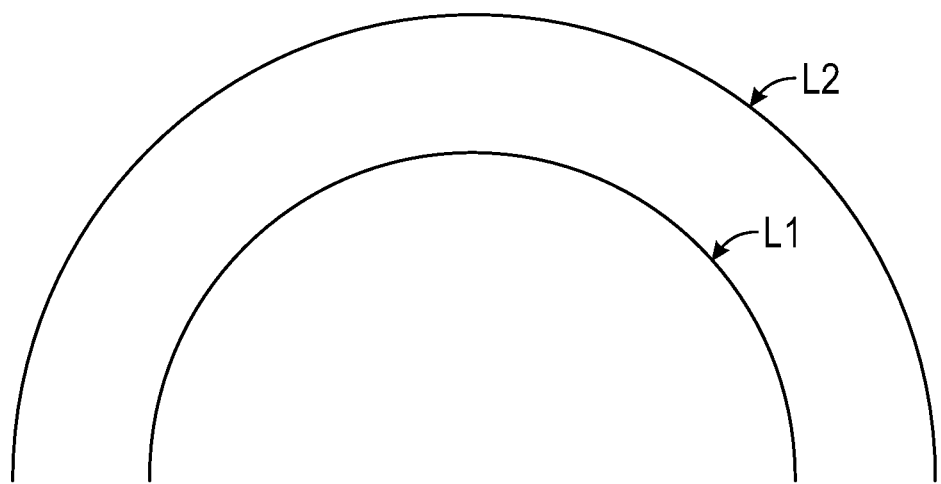
FIG. 3A illustrates an example of a curved rail length difference.
Figure 3B:
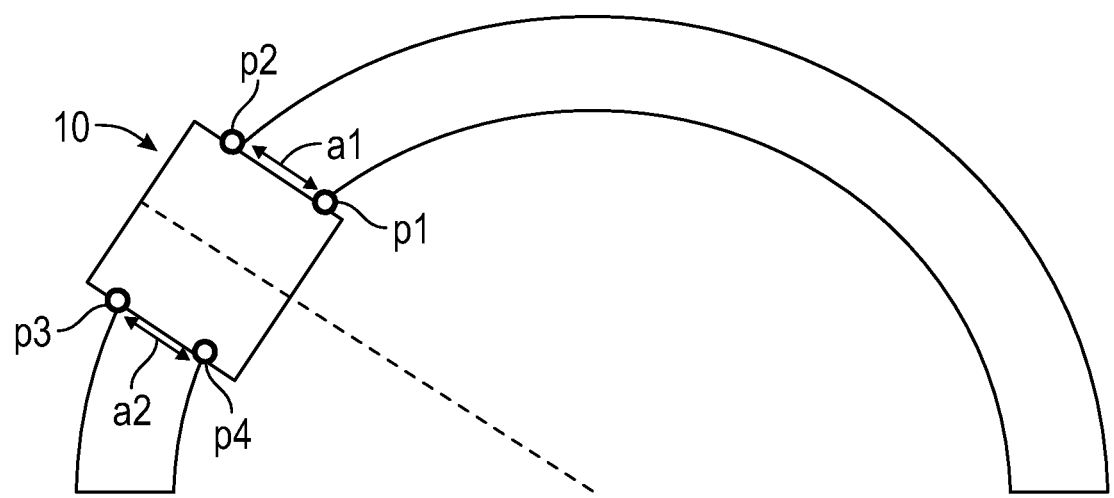
FIG. 3B illustrates an example of the curved rail travel distance between the outside curve and the inside curve.

FIGS. 3A and 3B illustrate an example of the curved section of the rails. In the following discussion, the wheel set 350A,D is assumed to travel on the inside of the curved section of the rail and the wheel set 350B,C is assumed to travel on the outside of the curved section of the rail.

FIG. 3A-3B demonstrate the perpendicular movement function of wheel assemblies 350A-D. This function is utilized to enable the monitoring carriage 10 to move around a curved segment of rail 501 which has a larger exterior radius L2 than its interior radius L1 as illustrated in FIG. 3A. FIG. 3B shows that the perpendicular distance a1 between wheel assemblies 350A-350B and the perpendicular distance a2 between wheel assemblies 350C-350D changes as the monitoring carriage 10 travels along the curved section of rail 501. In the example shown in FIGS. 3A-3B, the distance a1 between wheel assembly 350A and wheel assembly 350B is recorded at fixed locations on the curved segment of rail 501 labeled as points p1 and p2 respectively. While wheel assemblies 350A-350B are at locations p1 and p2, the other wheel assemblies 350C-350D are at locations on rail 501 labeled as p3 and p4 respectively; this distance between the wheel assemblies 350C-350D is designated a2. Due to the difference in radius L1 and L2, the distance a1 is different from the distance a2. This difference in distance between a1 and a2 requires the perpendicular movement function of the wheel assemblies 350A-D

The springs 304A-D enable the wheel assemblies 350A-D to change the width between the inside wheel set 350A,D and the outside wheel set 350B,C. That is, the springs 304A-D enable the wheel assemblies 350A-D to slide along the frame 300 in a direction perpendicular to the rail 501 so that the wheel assemblies 350A-D do not disengage from the rails. For example, the springs 304A, which connect wheel assembly 350A to the frame 300, and the springs 304B which connect wheel assembly 350B to the frame 300, allow the width between the wheel assemblies 350A and 350B to increase or decrease as the monitoring carriage 10 travels on the rail 501.

Depending on the segment of the rail on which monitoring carriage 10 was traveling, the width of the rail was found to vary. For example, along a straight section of the rail the width of the rail was found to be 35.0±0.1 mm, while on a curved section of the rail, the value becomes amplified by the outside curve so the width of the rail was found to change to 36.0±1.0 mm.

Figure 4A:
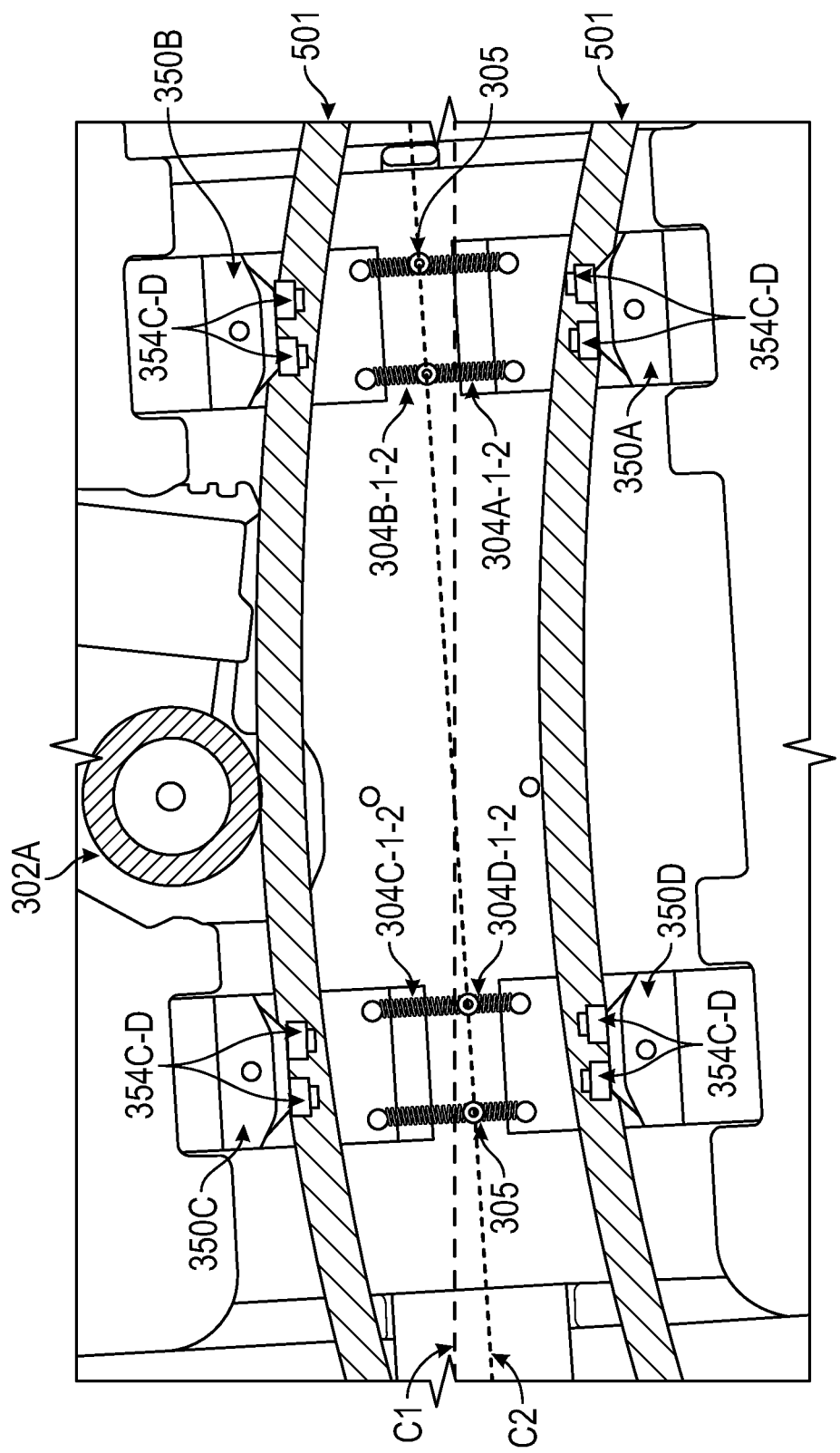
FIG. 4A illustrates an underside view of a carriage with no centering unit.
Figure 4B:
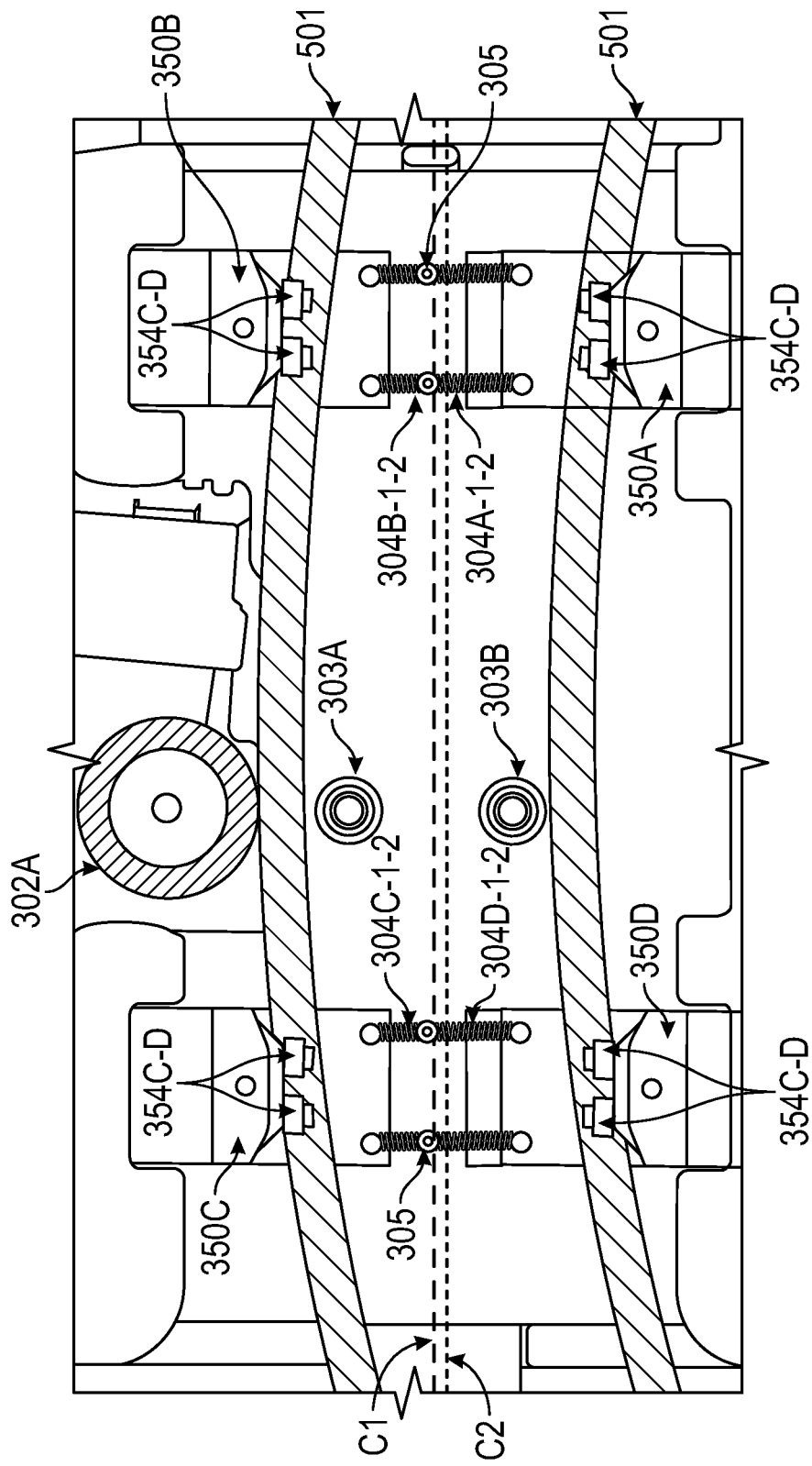
FIG. 4B illustrates centering units installed in the example embodiment carriage to improve centering alignment.

The centering units 303A-B are utilized to maintain proper alignment of the monitoring carriage 10 with the rail 501. Proper alignment is achieved when the center line C2 of the monitoring carriage 10 aligns with the center line C1 of the rail 501 in the direction of travel as shown in FIG. 4B. As illustrated in FIG. 4A, without the centering units 303A-B the clamping force exerted on the rail 501 by the motorized driving wheel 302A causes the monitoring carriage to shift perpendicularly to the direction of travel thus misaligning the center line C2 of the monitoring carriage 10 with the center line C1 of the rail 501. The centering units 303A-B act as a hard stop and creates a physical limit to the perpendicular distance of travel. Limiting the perpendicular travel allows the monitoring carriage 10 to better maintain proper alignment when traveling along the rail 501. One or more instances of centering units 303 may touch the rail 501 depending on the position of monitoring carriage 10.

Figure 5:
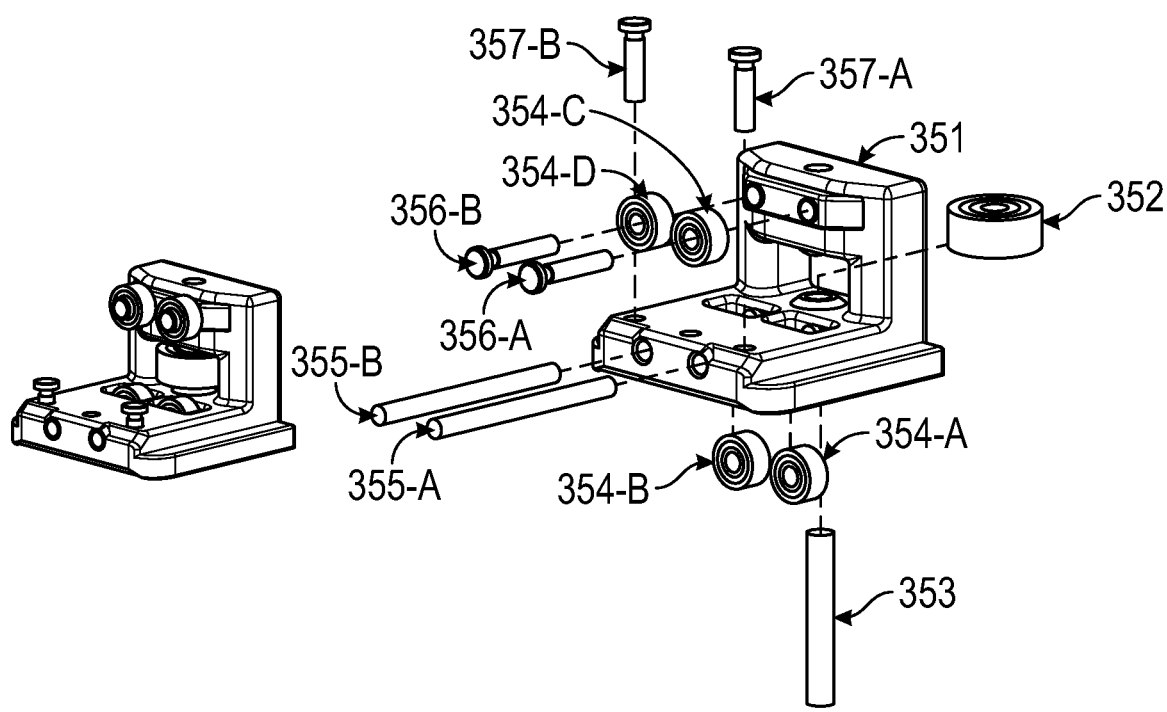
FIG. 5 illustrates a wheel assembly and an exploded view of the wheel assembly of the example embodiment.

As illustrated in FIG. 5, the wheel assembly body 351 is an L-shaped body designed to house the large guiding unit 352 and the small guiding units 354, the large rod 353 and the small rods 355, and the long pins 356 and the short pins 357. The L-shaped body slides between the frame 300 and the PCB 100 with lateral motion limited by the springs 304A-D. Large guiding unit 352 is a large rotating object (i.e., roller, bearing, bushing, etc.) that is attached to the wheel assembly body 351 by the large rod 353. The small guiding units 354 are small rotating objects (i.e., roller, bearing, bushing, etc.) that are attached to the wheel assembly body 351 by the small rods 355 and the long pins 356. The large rod 353 is a cylindrical object that can be made from various materials (i.e., steel, aluminum, brass, copper, plastic, etc.) and can be used to hold objects in place, such as bearings, printed circuit boards, etc. The small rods 355 are small cylindrical objects that can be made from various materials (i.e., steel, aluminum, brass, copper, plastic, etc.) and can be used to hold objects in place such as bearings, printed circuit boards, etc. The long pins 356 are pins that hold the small guiding units 354 to the wheel assembly body 351. The short pins 357 attach and hold the springs 304A-B to the frame 300.

Figure 6:
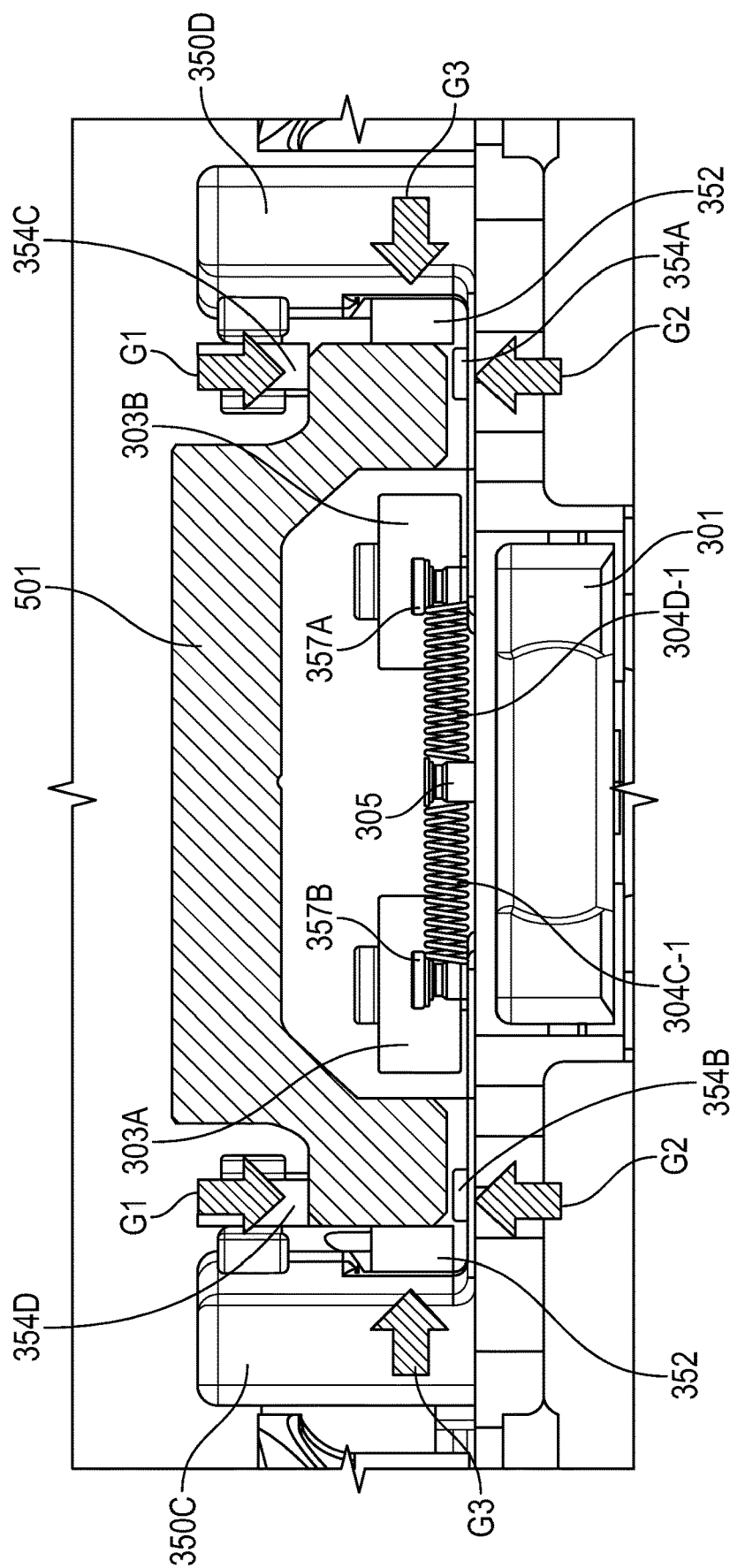
FIG. 6 illustrates three points of contact of a set of wheel assemblies holding onto the rail.

FIG. 6 illustrates a side view of a pair of opposing wheel assemblies 350 in contact with the rail 501. For this example, wheel assemblies 350C and 350D (350C-D) are illustrated. The wheel assemblies 350C-D each provide three points of contact on each side of the rail 501 respectively. The small guiding units 354C-D make contact with the top of the rail 501 and provide a downward force G1; the small guiding units 354A-B make contact with the bottom of the rail 501 and provide an upward force G2; and the large guiding units 352 contact the sides of the rail 501 and provide an inward force G3. The springs 304C-D, which are connected to the short pins 357A-B on the wheel assemblies 350C-D and to the posts 305 on the frame 300, exert an inward force that pulls the wheel assemblies toward the rail 501.

Figure 7:
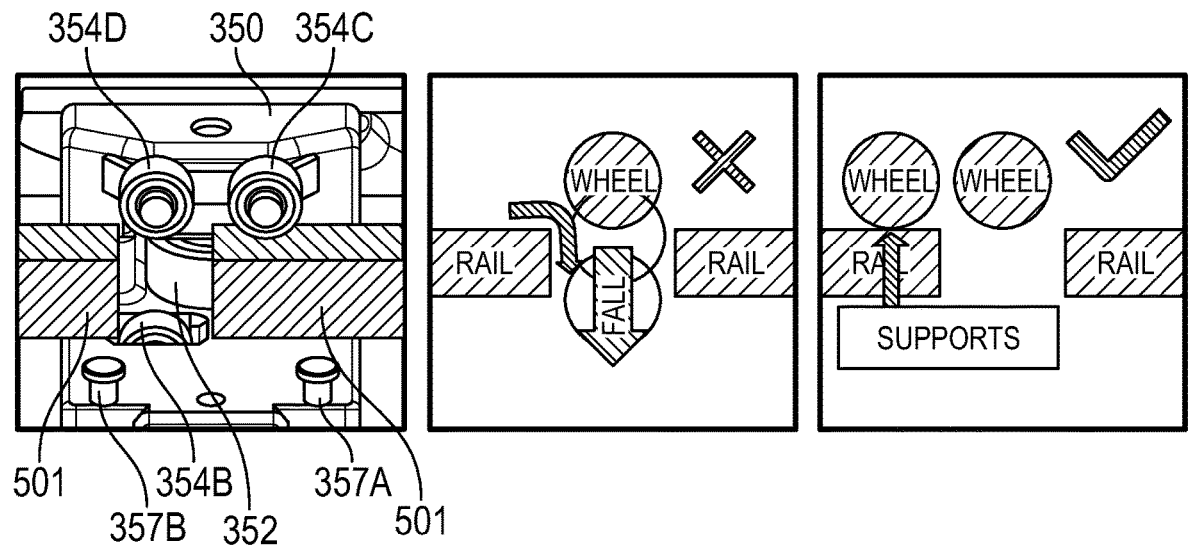
FIG. 7 illustrates an example design of utilizing dual small guiding units to overcome gaps in the rail by providing additional support.
Figure 10:
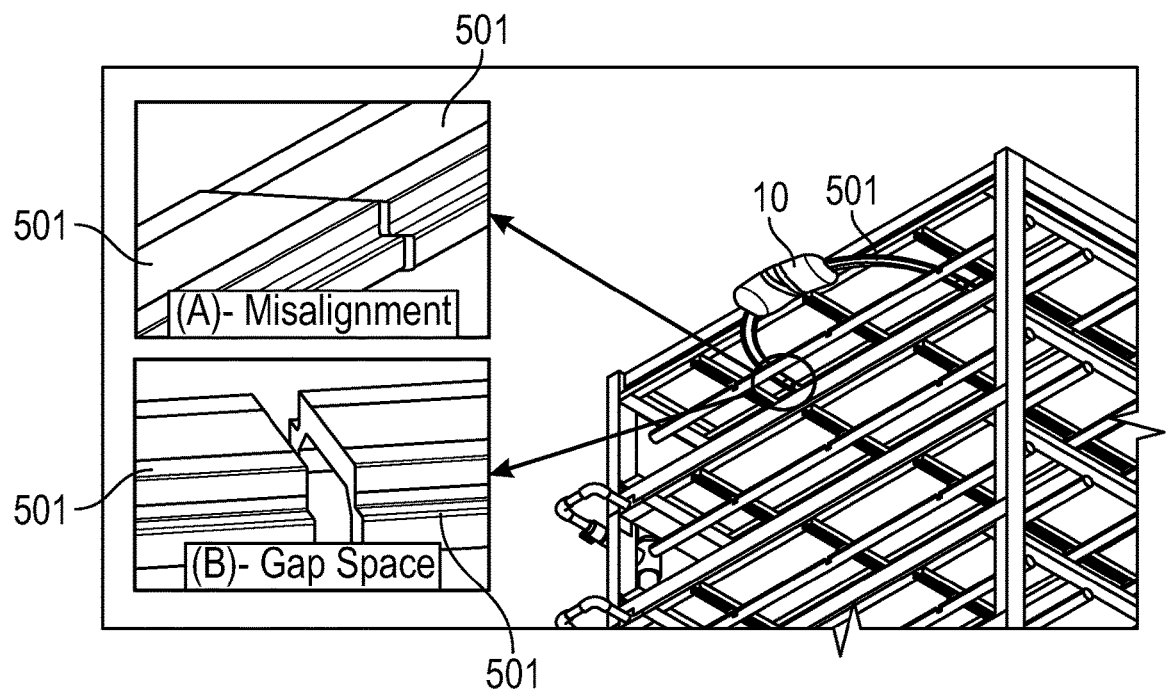
FIG. 10 illustrates examples of a misalignment and a gap space in the rail.

The rails 501 of an extensive rail structure 1000 can often develop imperfections like those illustrated in FIG. 10. FIG. 7 illustrates the advantage of utilizing the dual small guiding units 354C-D to overcome gaps in the rail 501, in comparison to the known practice of only using a single guide. When a wheel assembly 350 encounters a gap, the dual small guiding units 354C-D provide the additional support to maintain the wheel assembly at the level of the top of the rail 501, which reduces the chance of the monitoring carriage 10 being unable to move across the gap.

Figure 8:
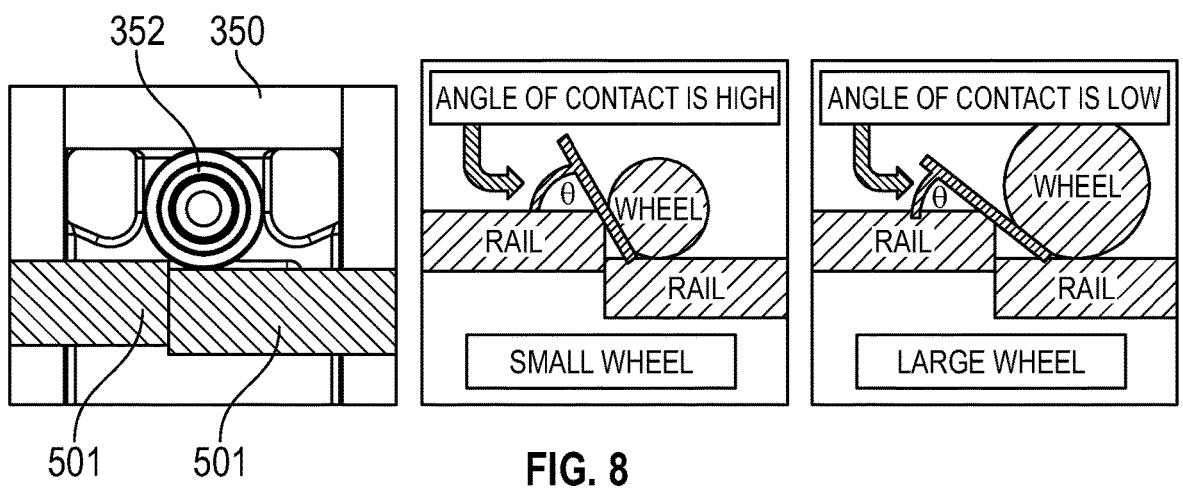
FIG. 8 illustrates an example of a large guiding unit to overcome misalignment of the rail.

FIG. 8 illustrates a top down view of how the large guiding unit 352 is used to provide smooth lateral motion for the monitoring carriage 10, in comparison to the known practice of using a small wheel. If the rail becomes misaligned, as illustrated in FIG. 10, the large guiding unit 352 ensures that the respective wheel assembly 350 can overcome a high angle of contact 8 that usually is a cause of high friction. To minimize the chance of a misalignment causing the monitoring carriage 10 to stop moving, the large guiding unit 352 needs to be larger than the top and bottom small guiding units 354.

Figure 9A:
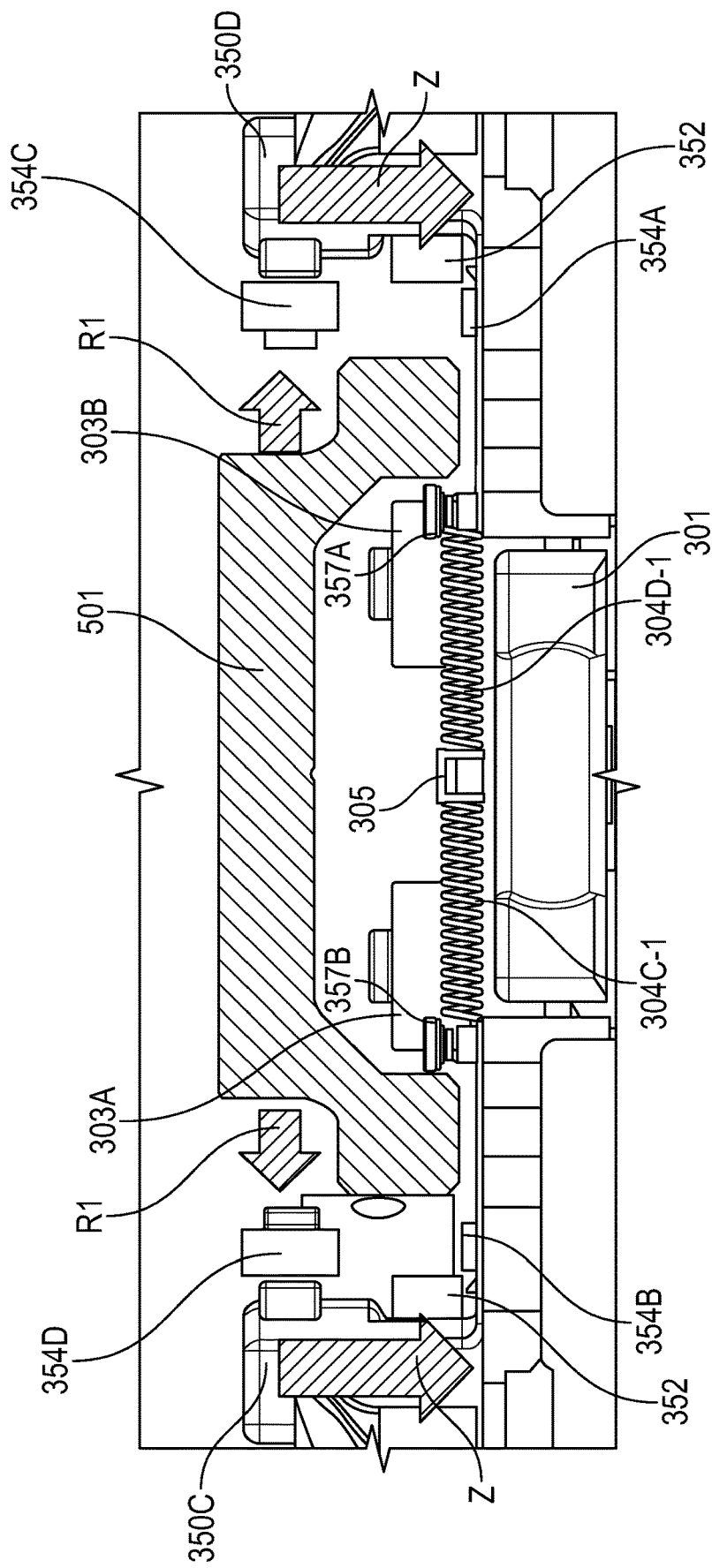
FIG. 9A illustrates a visual representation of the configuration to easily remove the monitoring carriage from the rail.
Figure 9B:
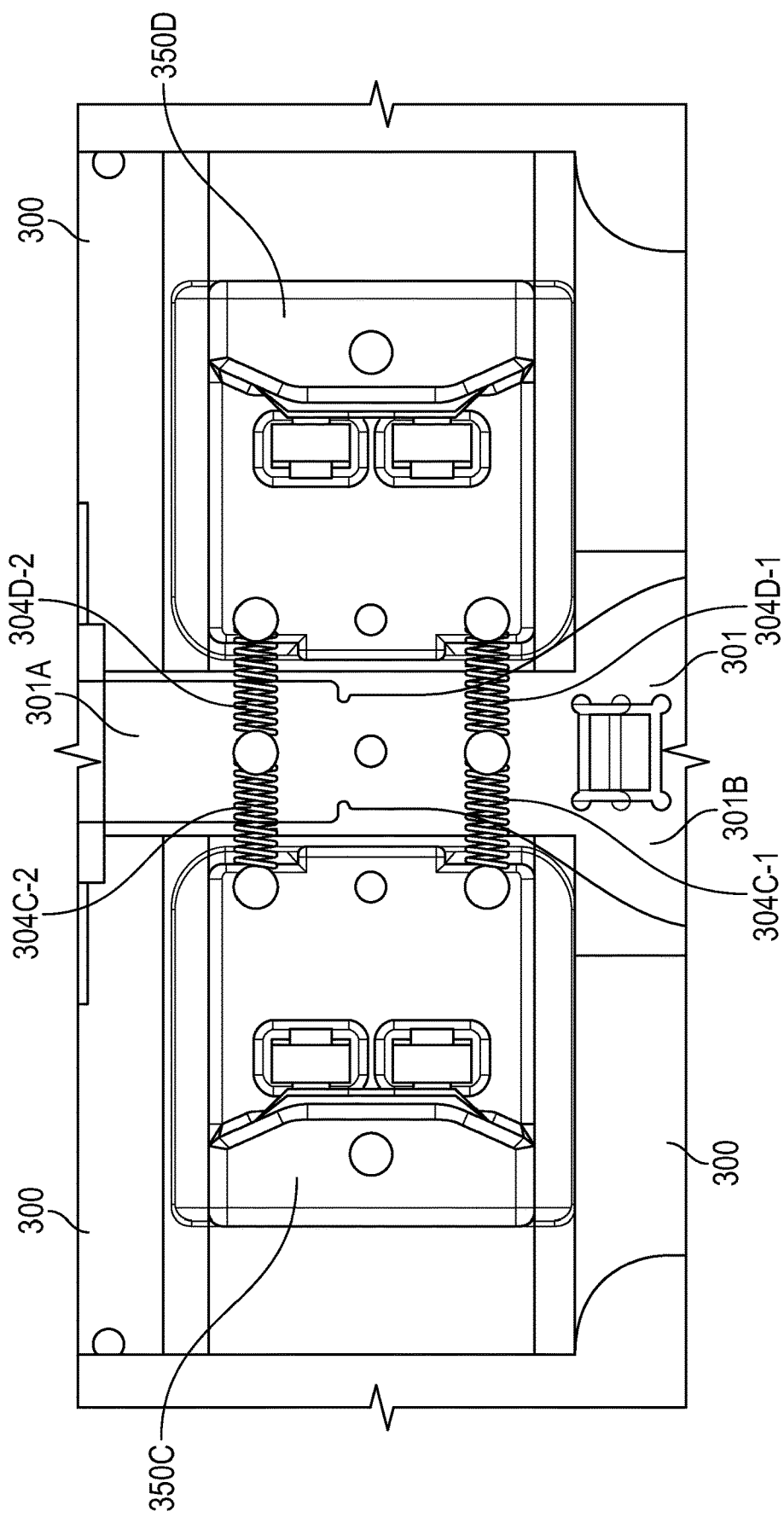
FIG. 9B illustrates an example configuration of the monitoring carriage before being configured for easy removal from the rail.
Figure 9C:
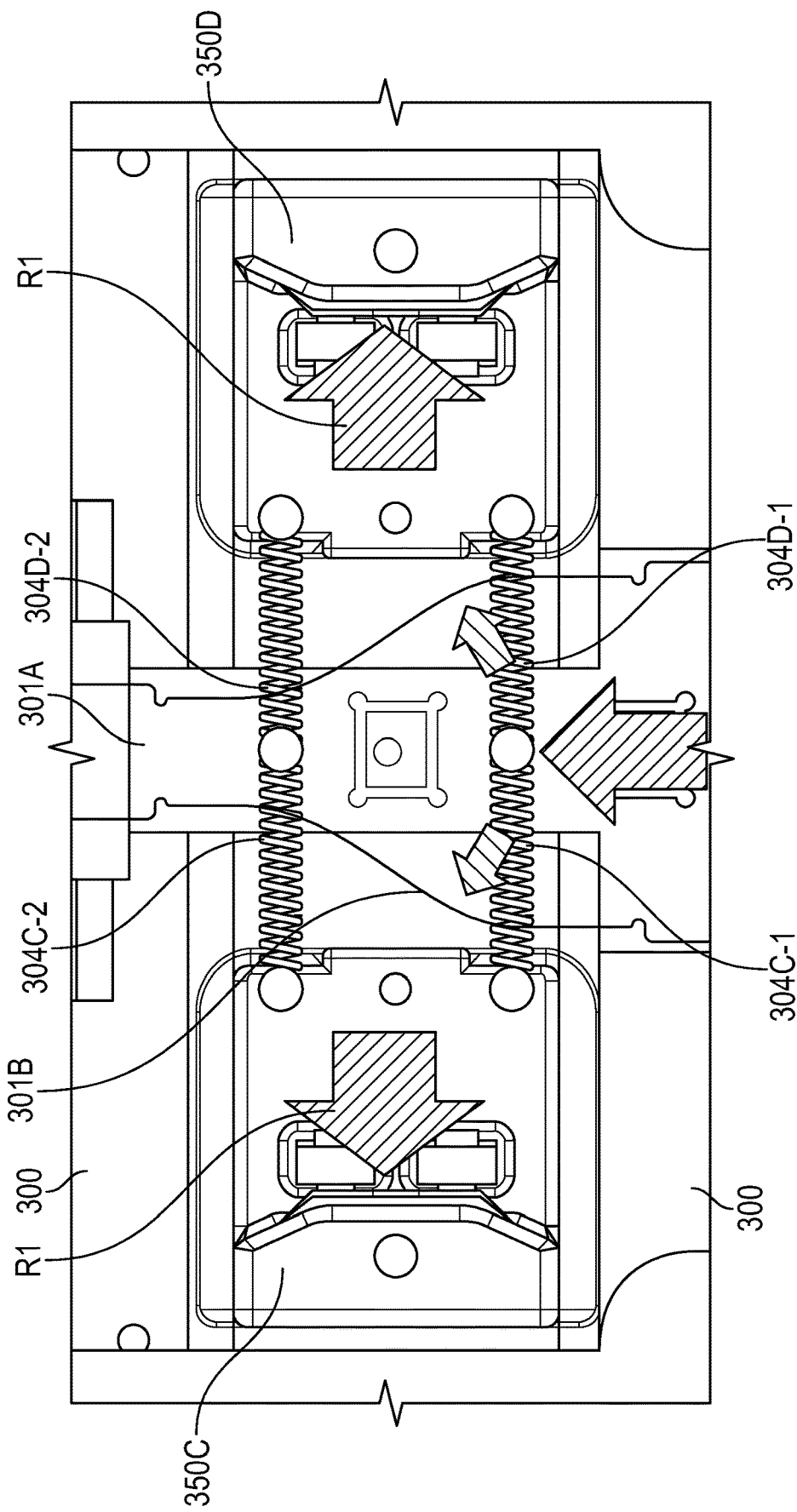
FIG. 9C illustrates an example configuration of the monitoring carriage after performing an operation to allow for easy removal from the rail.

FIG. 9A provides a side view illustrating the wheel assemblies 350C-D as disengaged from the rail 501 for easy removal of the monitoring carriage 10 from the rail 501. FIG. 9B illustrates a top view of the opposing pair of wheel assemblies 350C-D and the wedge 301, with the wedge 301 in the unengaged position. The springs 304C-D are holding the wheel assemblies 350C-D to the frame 300 and the wedge 301 are in a resting position. The wedge 301 is engaged by pushing toward the center of the monitoring carriage 10, as illustrated in FIG. 9C, where the wheel assemblies 350C-D are pushed outward. This applies an outward force R1 on the wheel assemblies 350C-D, causing them to slide away from the rail 501. This enables the monitoring carriage 10 to be easily installed or removed from the rail 501 in a vertical direction Z without needing to pull each individual wheel assembly 350C-D apart.

When the wedge 301 is in the unengaged position, the narrow segments 301A of the wedge 301 are in contact with the wheel assemblies 350C-D. When the wedge 301 is in the engaged position, the wide segments 301B of the wedge 301 are in contact with the wheel assemblies 350C-D. This causes the wheel set 350A,D to be pushed away from the frame 300 on one side of the monitoring carriage 10 and the wheel set 350B,C to be pushed away from the frame 300 on the other side of the monitoring carriage 10.

The monitoring carriage 10 travels on the rails 501 via the driving wheel assembly 302.

A charging station 505 is installed on the rack 503 next to the rail 501. The charging station 505 is a wireless charging system and is designed to prevent a spark or a short circuit due to external elements such as water splashing from a planting bed of the vertical farm. The charging station 505 includes a magnet that generates a magnetic field sufficient enough to be detected by the sensor 106.

Near field communication (NFC) tags 506 are installed on the rack next to the rail 501. The NFC tags 506 communicate with the NFC reading assembly 103 and are installed at multiple points. These points are determined based on capturing all of the plants, crops, etc., located on the rack 503.

Figure 12A:
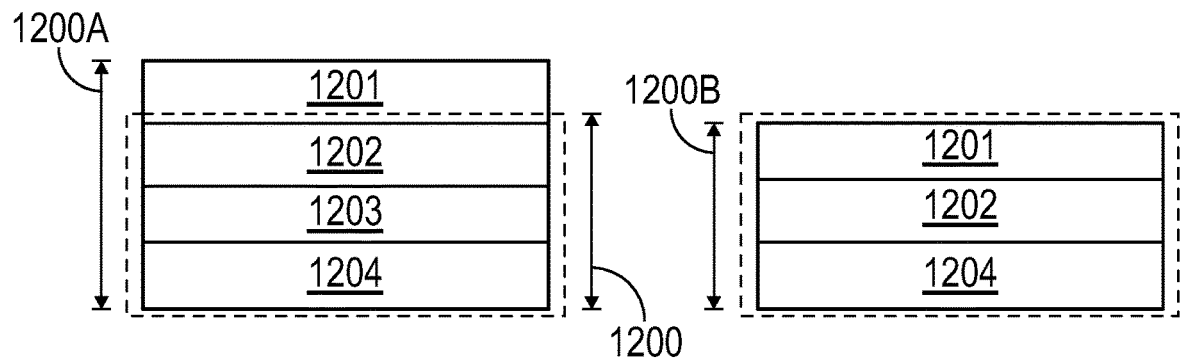
FIG. 12A illustrates a schematic comparison of the reduction of operational height that can be realized by the removal or significant reduction of a mechanical substrate.
Figure 12B:
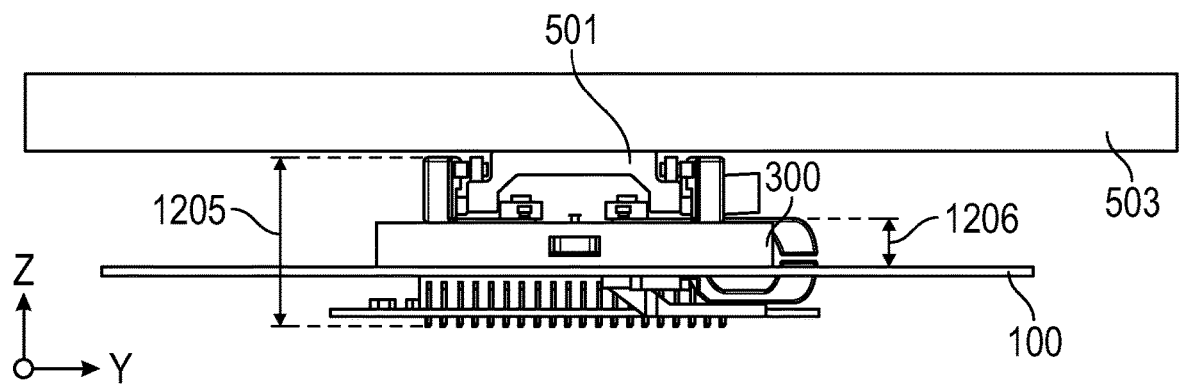
FIG. 12B illustrates a side view of an example carriage with a mechanical substrate in an operational environment.
Figure 12C:
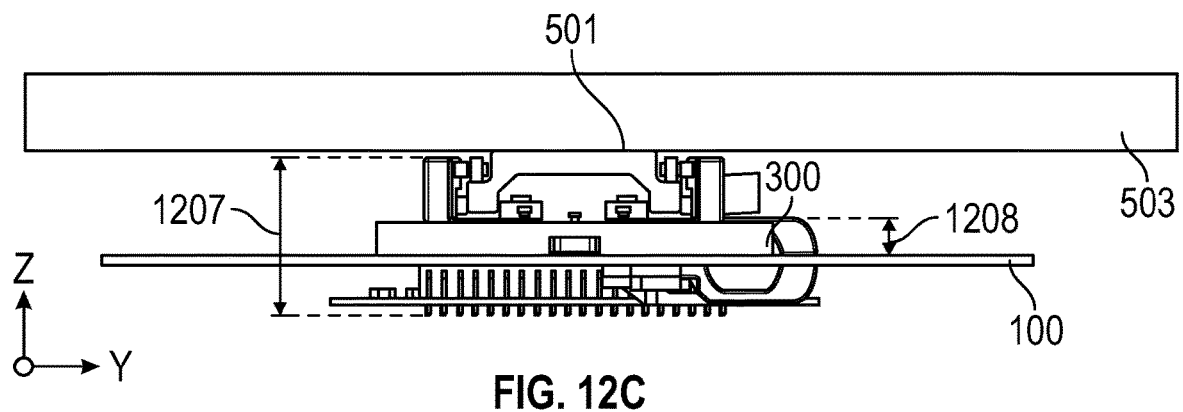
FIG. 12C illustrate a side view of the modified carriage in the operational environment.
Figure 13:
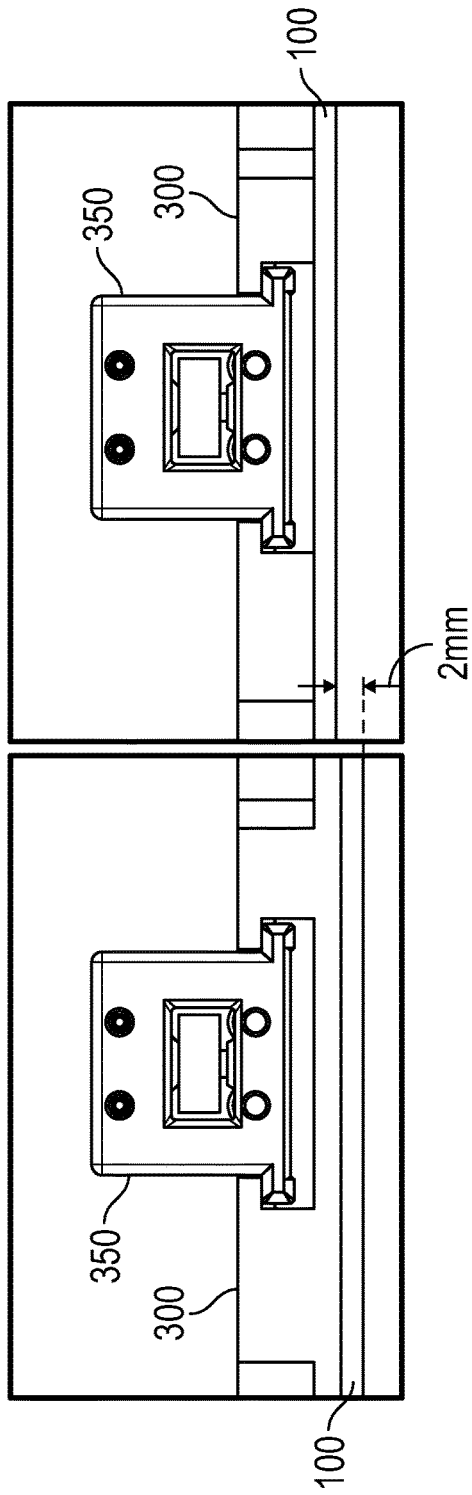
FIG. 13 illustrates an example embodiment of the physical retention of a wheel assembly by the frame and the PCB.
Figure 14:
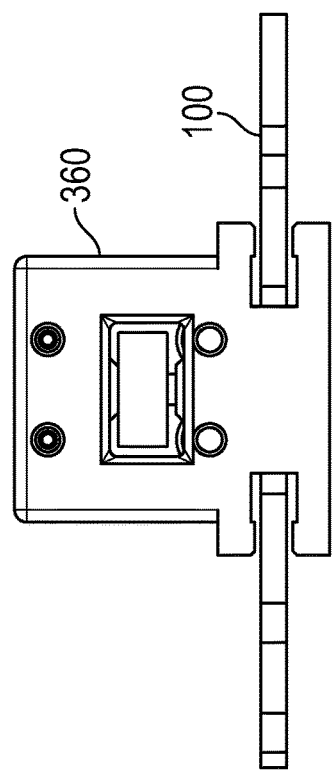
FIG. 14 illustrates an alternate example embodiment of the physical retention of the wheel assembly by the PCB.
Figure 14:
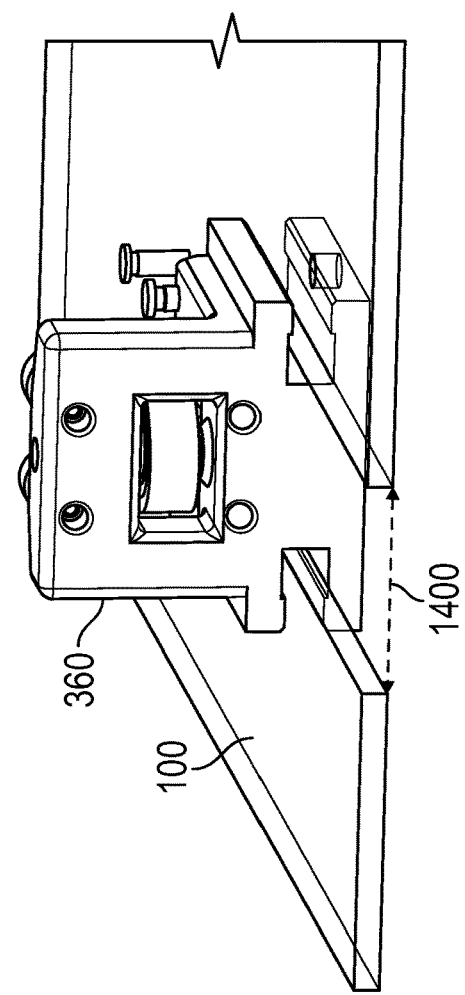

FIGS. 12-14 relate to the reduction of the operational height of an example carriage. As previously discussed, the height 1110 between layers in the rack structure 1000 is limited. Thus, a monitoring carriage system requires as small an operating envelope 1200 as possible in order to fit within the limit space between rack layers.

FIG. 12A illustrates a schematic comparison of the operational height 1200A of a known configuration, of electrical components 1201 attached to an electrical substrate 1202 with moving components 1204 attached to a mechanical substrate 1203, as compared to the reduced operational height 1200B that can be realized by the removal or significant reduction of the mechanical substrate 1203.

FIGS. 12B, 12C and 13 illustrate a side view comparison between the height of the explanatory embodiment (as illustrated in FIGS. 2A and 2B) vs. an alternative embodiment which minimizes or eliminates the mechanical substrate 1203 (frame 300). FIG. 12B illustrates a version of the monitoring carriage 10 using a known mounting method where the mechanical substrate (frame 300) is separate from the electrical substrate (PCB 100). This assembly has an overall dimension 1205 in the Z-axis direction of 27.61 mm with a dimension 1206 of the frame 300 measuring 7.38 mm in the Z-axis direction. FIG. 12C illustrates an the alternative embodiment which has an overall dimension 1207 of 25.61 mm in the Z-axis direction which represents a 7% reduction in height from the assembly illustrated in FIG. 12B. This is accomplished by reducing the height of the frame 300 by 2 mm as illustrated in FIG. 13. Thus, by utilizing the alternative embodiment, the height of the frame 300 1208 can be reduced to 5.38 mm representing a 27% reduction in height.

While FIG. 13 illustrates the exemplary embodiment of the physical retention of the wheel assembly 350 by the frame 300 and the PCB 100, FIG. 14 illustrates an alternate wheel assembly 360 and physical retention method. The alternate wheel assembly 360 includes additional elements which have been added to create a configuration that only requires physical retention of the wheel assembly by the PCB 100. The retention provided by the PCB 100 is achieved by incorporating a cut out section 1400 in one or more areas to enable attachment of the wheel assembly 360. This alternate exemplary embodiment provides an additional reduction in the operational height requirement of the assembly.

The invention claimed is:

1. A carriage for traveling on a rail, the carriage comprising:
 a first moving unit located on one side of the rail and configured to move along the rail;
 a second moving unit located on a different side of the rail from the first moving unit and configured to move along the rail;
  wherein the first moving unit and the second moving unit are aligned along a direction perpendicular to the direction of the rail and are connected to each other by
 a spring unit configured to slide the first moving unit and the second moving unit, in a direction perpendicular to a direction of the rail; and
 a position maintaining unit located between the first moving unit and the second moving unit, wherein the position maintaining unit prevents the first moving unit or the second moving unit from sliding more than a predetermined distance when traveling along the rail.

2. The carriage according to claim 1, further comprising:
 a third moving unit; and
 a fourth moving unit,
 wherein the third moving unit and the forth moving unit are aligned along a direction perpendicular to the direction of the rail.

3. The carriage according to claim 2, wherein the position maintaining unit is located between a first group consisting of the first moving unit and the second moving unit and a second group consisting of the third moving unit and the fourth moving unit.

4. A carriage that records data while moving on a rail system, the carriage comprising:
 a moving unit configured to travel along a rail;
 an electronic substrate;
 a slide unit configured to enable the moving unit to slide in a direction perpendicular to the rail; and
 a recording unit configured to record data,
 wherein a portion of the moving unit is located adjacent to the electronic substrate and, wherein the slide unit can slide on a surface of the electronic substrate.

5. The carriage according to claim 4, wherein:
 the rail system comprises at least a first and a second level of rails,
  wherein the first and second level of rails are vertically spaced apart from each other with a distance between,
 wherein the carriage has a height, and
 wherein a height of the carriage is less than the vertical distance between a first level and a second level of the rail system.

6. The carriage according to claim 4, wherein at least one electronic component is located on a side of the electronic substrate opposite to a side where the moving unit is located.

7. The carriage according to claim 4, wherein at least one mechanical component is located on a side of the electronic substrate that the moving unit is located on.

8. The carriage according to claim 4, further comprising at least one movement device that contacts the rail, and wherein each of the at least one movement device is located along a direction perpendicular to the surface of the electronic substrate.

9. The carriage according to claim 4, further comprising a position maintaining unit configured to prevent the moving unit from sliding more than a predetermined distance when traveling along the rail.

10. The carriage according to claim 4, wherein the recording unit is an image capturing apparatus configured to take images.

11. The carriage according to claim 10, wherein the carriage is further configured with lighting to illuminate objects being recorded by the recording unit.

12. The carriage according to claim 11, wherein the lighting provides light in a plurality of wavelengths.

* * * * *